(12) United States Patent
Robins (10) Patent No.: US 9,486,943 B1
(45) Date of Patent: Nov. 8, 2016

(54) METHOD FOR CREATING MANDRELS WITH VOIDS FOR EXPANSION CONTROL DURING CURING

(71) Applicant: The Boeing Company, Chicago, IL (US)

(72) Inventor: Brian Gregory Robins, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 379 days.

(21) Appl. No.: 13/665,882

(22) Filed: Oct. 31, 2012

(51) Int. Cl.
| | |
|---|---|
| B29C 33/38 | (2006.01) |
| B29C 33/50 | (2006.01) |
| B29C 37/00 | (2006.01) |
| B29L 31/00 | (2006.01) |
| B29C 33/48 | (2006.01) |

(52) U.S. Cl.
CPC ......... *B29C 33/3842* (2013.01); *B29C 33/505* (2013.01); *B29C 33/485* (2013.01); *B29L 2031/757* (2013.01)

(58) Field of Classification Search
CPC ........... B64C 3/20; B64C 1/12; B64C 1/064; B29C 33/485; B29C 33/505; B29C 33/3842
USPC ....................................................... 264/313
See application file for complete search history.

(56) References Cited

U.S. PATENT DOCUMENTS

| | | | | |
|---|---|---|---|---|
| 2,886,853 | A | * | 5/1959 | Herman et al. ............... 264/535 |
| 3,795,559 | A | | 3/1974 | Horn et al. |
| 4,460,531 | A | * | 7/1984 | Harris et al. .................. 264/138 |
| 4,591,470 | A | | 5/1986 | Goto et al. |
| 5,817,269 | A | | 10/1998 | Younie et al. |
| 6,655,633 | B1 | * | 12/2003 | Chapman, Jr. ............. 244/123.9 |
| 7,052,572 | B2 | | 5/2006 | Miura et al. |
| 7,293,737 | B2 | | 11/2007 | Engwall et al. |
| 2006/0108057 | A1 | * | 5/2006 | Pham et al. .................. 156/245 |
| 2007/0175031 | A1 | * | 8/2007 | Pham et al. ................. 29/889.2 |
| 2010/0006739 | A1 | | 1/2010 | Robins et al. |
| 2010/0009124 | A1 | * | 1/2010 | Robins et al. ................ 428/156 |

FOREIGN PATENT DOCUMENTS

BE 502991 * 5/1951

OTHER PUBLICATIONS

Schreiber Translation, Inc., Translation of BE 502991, Jul. 2008, cover and pp. 1-17.*

* cited by examiner

*Primary Examiner* — Christina Johnson
*Assistant Examiner* — Patrick Butler
(74) *Attorney, Agent, or Firm* — Yee & Associates, P.C.

(57) ABSTRACT

A method and apparatus for forming a tool is provided. A number of members comprised of a thermoplastic material is positioned within a hollow portion of a structure. The tool is formed within the hollow portion of the structure with the number of members positioned within the hollow portion of the structure. Heat is applied within a selected range to the number of members to reduce a size of each of the number of members. The number of members is removed from the tool such that the tool is left with a number of voids.

7 Claims, 12 Drawing Sheets

METHOD FOR CREATING MANDRELS WITH VOIDS FOR EXPANSION CONTROL DURING CURING

BACKGROUND INFORMATION

1. Field

The present disclosure relates generally to mandrels and, in particular, to mandrels used in curing processes for forming composite structures. Still more particularly, the present disclosure relates to an apparatus, system, and method for forming a mandrel having voids configured to control expansion of the mandrel during a curing process.

2. Background

Mandrels are oftentimes used to form composite structures. As used herein, a "mandrel" is an object formed having a shape representative of a desired shape for a composite structure. A "composite structure", as used herein, may be any structure or part comprised of composite material.

As one illustrative example, a composite laminate may be placed over a mandrel such that the composite laminate molds to the shape of the mandrel. The composite laminate may be comprised of any number of layers of composite material. Next, the composite laminate and the mandrel may both be cured such that the composite laminate consolidates to form a composite structure. The composite structure retains the shape of the mandrel even when the mandrel is removed. In particular, the composite structure may be hollowed inwards when the mandrel is removed. This hollow portion of the composite structure may be referred to as a "cavity" in some cases.

The mandrels used for forming composite structures may be formed from various materials. A mandrel may be formed from, for example, without limitation, a rubber material, a composite material, a metal, a dissolvable material, an elastomeric material, some other type of material, or some combination of the above.

In some situations, the material used to form the mandrel may respond to the heat and/or pressure generated during curing in an undesired manner. In one illustrative example, at least a portion of the mandrel may expand during curing and cause uneven pressure to be applied towards the composite laminate placed over the mandrel. The application of uneven pressure to the composite laminate may result in a composite structure that does not have the desired shape for the composite structure and/or that does not meet selected tolerances. In some situations, this uneven pressure may cause the shape of the cavity that is formed in the composite structure once the mandrel is removed to be distorted with respect to a desired shape for the cavity.

Consequently, a number of voids may be introduced into the mandrel when the mandrel is formed. These voids may help control expansion of the mandrel during the curing process such that substantially even pressure is applied to the composite laminate during curing. These voids may need to be formed within selected tolerances to provide the desired expansion control. However, some currently available methods for forming these voids within a mandrel may be unable to form voids having dimensions within selected tolerances.

For example, some currently available methods may use extrusion techniques to form these voids. Extrusion may include pushing or drawing the material for the mandrel through a die of the desired shape having the desired cross-sectional profile. However, some currently available extrusion techniques may be unable to form voids having dimensions within selected tolerances.

Other currently available methods for forming voids may use molding techniques. Molding may include using a die to mold the mandrel and then extracting the die from the molded mandrel. However, this extraction may be more difficult than desired. Further, the extraction of the die may cause one or more undesired inconsistencies to be formed on or in the mandrel.

In this manner, the currently available methods for forming mandrels having voids that use the above-described extrusion techniques or molding techniques may be unable to form a mandrel that meets selected tolerances. Additionally, some currently available methods for forming voids in mandrels may be more expensive and/or time-consuming than desired. Therefore, it would be desirable to have a method and apparatus that takes into account at least some of the issues discussed above, as well as other possible issues.

SUMMARY

In one illustrative embodiment, an apparatus comprises a structure and a number of members. The structure has a first end, a second end, and a hollow portion located between the first end of the structure and the second end of the structure. The number of members is comprised of a thermoplastic material and is configured to be positioned within the hollow portion of the structure to create a number of voids in a tool that is formed within the hollow portion of the structure.

In another illustrative embodiment, a tool forming system comprises a structure, a first plate, a second plate, a number of members, and a support system. The structure has a first end, a second end, and a hollow portion located between the first end of the structure and the second end of the structure. The first plate is associated with the first end of the structure and has a first number of openings. The second plate is associated with the second end of the structure and has a second number of openings. The number of members is comprised of a thermoplastic material and is configured to be inserted through the first number of openings and the second number of openings such that the number of members is suspended within the hollow portion of the structure. The support system is configured to support the number of members within the hollow portion of the structure while a material is poured into the hollow portion of the structure around the number of members and allowed to harden to form a tool having a number of voids.

In yet another illustrative embodiment, a method for forming a tool is provided. A number of members comprised of a thermoplastic material is positioned within a hollow portion of a structure. The tool is formed within the hollow portion of the structure with the number of members positioned within the hollow portion of the structure. Heat is applied within a selected range to the number of members to reduce a size of each of the number of members. The number of members is removed from the tool such that the tool is left with a number of voids.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the illustrative embodiments recognize and take into account that it may be desirable to have a method for forming a mandrel having one or more voids that is capable of forming these voids with dimensions within selected tolerances. Further, illustrative embodiments recognize and take into account that it may be desirable to have a method for forming a mandrel having one or more voids that does not cause any undesired inconsistencies to be formed on or in the mandrel.

Thus, the illustrative embodiments provide an apparatus, system, and method for forming a mandrel having a number of voids. As used herein, a "number of" items means one or more items. In this manner, a number of voids may be one or more voids. In particular, in one illustrative embodiment, a mandrel may be formed with a number of voids using a number of members comprised of thermoplastic material.

Figure 1:
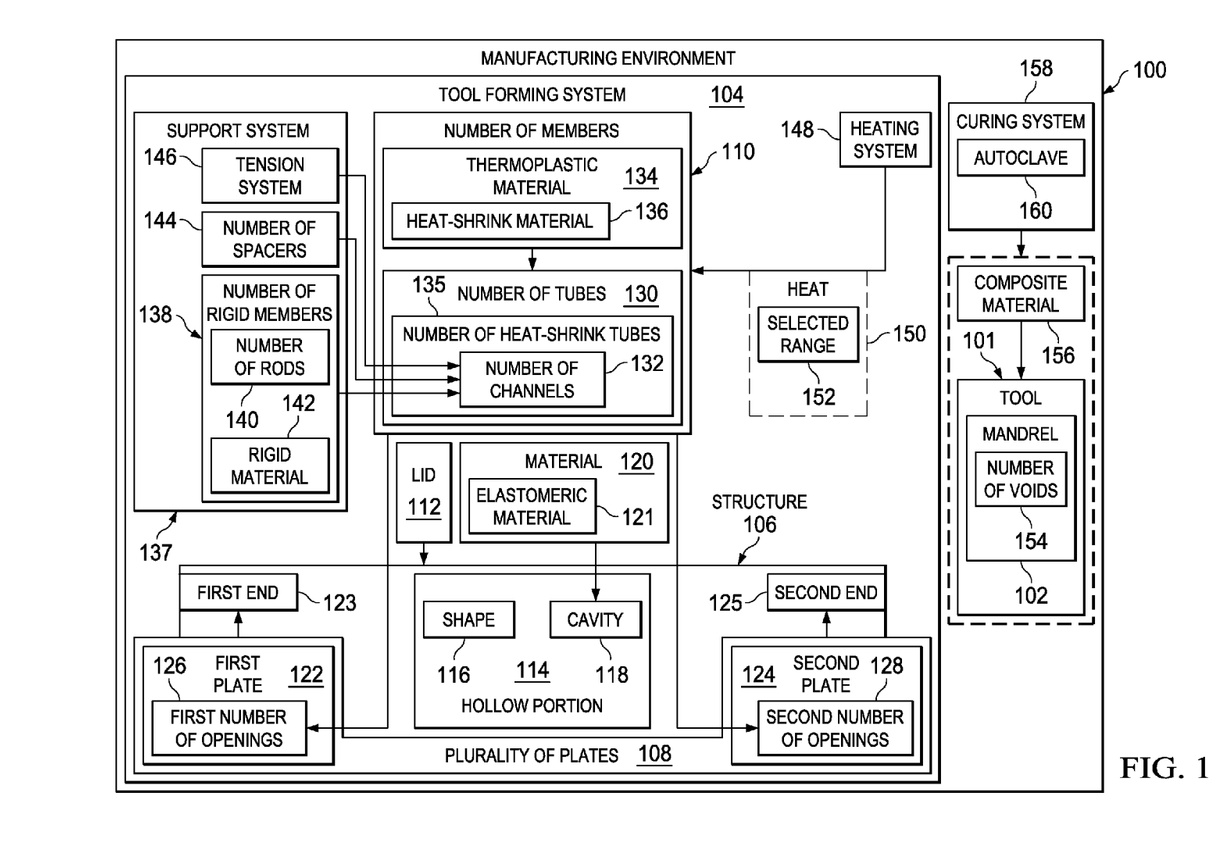
FIG. 1 is an illustration of a manufacturing environment in accordance with an illustrative embodiment.

Referring now to the figures and, in particular, with reference to FIG. 1, an illustration of a manufacturing environment is depicted in accordance with an illustrative embodiment. In FIG. 1, manufacturing environment 100 may be an example of one environment in which tool 101 may be formed. In this illustrative example, tool 101 may be an object formed having a shape representative of a desired shape for a composite structure. In these illustrative examples, tool 101 takes the form of mandrel 102.

As depicted, tool 101 may be formed using tool forming system 104 within manufacturing environment 100. When tool 101 takes the form of mandrel 102, tool forming system 104 may be referred to as a mandrel forming system.

In these illustrative examples, tool forming system 104 may include structure 106, plurality of plates 108, number of members 110, and lid 112. As depicted, structure 106 has hollow portion 114 having shape 116. Hollow portion 114 of structure 106 may take the form of cavity 118 in these illustrative examples.

Shape 116 of cavity 118 may be configured such that cavity 118 may receive material 120. Material 120 may be the material used to form mandrel 102. In one illustrative example, material 120 comprise elastomeric material 121. Of course, depending on the implementation, material 120 may comprise any number of materials. For example, without limitation, material 120 may comprise at least one of elastomeric material 121, a composite material, a rubber material, a silicone material, and some other type of material.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and some other suitable combination.

In these illustrative examples, plurality of plates 108 may be associated with structure 106. As used herein, when one component is "associated" with another component, this association is a physical association in the depicted examples.

For example, a first component, such as one of plurality of plates 108 may be considered to be associated with a second component, such as structure 106, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In one illustrative example, plurality of plates 108 includes first plate 122 and second plate 124. First plate 122 may be associated with first end 123 of structure 106, while second plate 124 may be associated with second end 125 of structure 106.

As depicted, first plate 122 may have first number of openings 126. Second plate 124 may have second number of openings 128. First number of openings 126 and second number of openings 128 may be positioned relative to hollow portion 114 of structure 106.

In one illustrative example, each opening in first number of openings 126 may correspond to an opening in second number of openings 128. First number of openings 126 and second number of openings 128 may both be configured to receive number of members 110. For example, a member in number of members 110 may be passed through an opening in first number of openings 126 and through a corresponding opening in second number of openings 128.

In this manner, number of members 110 may pass through hollow portion 114 of structure 106 between first plate 122 and second plate 124. In one illustrative example, at least one of number of members 110 may be held suspended in air within hollow portion 114 of structure 106 by first number of openings 126 in first plate 122 and second number of openings 128 in second plate 124. In these illustrative examples, number of members 110 may also extend past first plate 122 outside of structure 106 and past second plate 124 outside of structure 106.

In some illustrative examples, number of members 110 may take the form of number of tubes 130. Number of tubes 130 may include number of channels 132. In particular, each tube in number of tubes 130 may be a hollow tube having a corresponding channel in number of channels 132 that runs along the length of the tube.

Number of tubes 130 may have a number of different shapes and/or sizes depending on the implementation. For example, a cross-section of a tube in number of tubes 130 taken substantially perpendicularly to an axis running along the length of the tube may have a shape selected from one of a circular shape, an oval shape, an elliptical shape, a parabolic shape, a rectangular shape, a trapezoidal shape, a triangular shape, an oval shape, or some other type of polygonal shape.

When more than one tube is present in number of tubes 130, these tubes may have the same and/or different shapes. Further, when more than one tube is present in number of tubes 130, these tubes may have different sizes. For example, the cross-sections through the tubes may have different diameters and/or other types of dimensions.

Number of members 110 may be comprised of thermoplastic material 134 in these examples. In this manner, number of members 110 may be referred to as a number of thermoplastic members.

Thermoplastic material 134 may be any material that becomes pliable or moldable above a selected temperature threshold and returns to a solid state upon cooling. In these illustrative examples, thermoplastic material 134 may take the form of heat-shrink material 136. Heat-shrink material 136 may be configured to reduce in size in response to temperatures above a selected threshold. When number of members 110 takes the form of number of tubes 130 and is comprised of heat-shrink material 136, number of tubes 130 may be referred to as number of heat-shrink tubes 135.

In some illustrative examples, support system 137 may be used to provide support to number of tubes 130 when number of tubes 130 has been passed through first number of openings 126 and second number of openings 128. In one illustrative example, support system 137 takes the form of number of rigid members 138. Number of rigid members 138 may take the form of, for example, without limitation, number of rods 140.

Number of rigid members 138 may be configured for use with number of members 110 in the form of number of tubes 130. In particular, number of rigid members 138 may be inserted into number of channels 132 of number of tubes 130.

As depicted, number of rigid members 138 may be comprised of rigid material 142. Rigid material 142 is selected such that number of rigid members 138 may provide support for number of tubes 130. In particular, number of rigid members 138 allow number of tubes 130 to have a stiffness within a selected range while number of tubes 130 are suspended within hollow portion 114 of structure 106 by first number of openings 126 in first plate 122 and second number of openings 128 in second plate 124.

Of course, in other illustrative examples, support system 137 may be implemented in some other manner. As one illustrative example, support system 137 may take the form of number of spacers 144. Number of spacers 144 may be inserted within number of channels 132 of number of tubes 130 to provide support for number of tubes 130. In particular, number of spacers 144 may be inserted within the portion of number of channels 132 of number of tubes 130 suspended between first plate 122 and second plate 124.

In some cases, multiple spacers may be inserted at regular and/or irregular intervals along the length of the channel within each tube in number of tubes 130. In other cases, a single spacer may be inserted into the channel of each tube.

In still other illustrative examples, support system 137 may take the form of tension system 146. Tension system 146 may be configured to apply tension to the ends of number of members 110 such that number of members 110 has a desired stiffness within a selected range when suspended within hollow portion 114 of structure 106.

Once number of members 110 has been inserted through first number of openings 126 and second number of openings 128 and once support system 137 has been used to support number of members 110, material 120 for forming mandrel 102 may be put into hollow portion 114 of structure 106. In particular, material 120 may be poured into hollow portion 114 of structure 106 in a liquid state or a semi-solid state.

Thereafter, lid 112 may be placed over structure 106. Lid 112 may be used to ensure that the portion of material 120 exposed within hollow portion 114 of structure 106 is smoothed and flattened. In some cases, lid 112 may be a separate component from structure 106. In other illustrative examples, lid 112 may be associated with structure 106.

Once lid 112 has been placed over structure 106, material 120 may be allowed to harden and return to a solid state. In these illustrative examples, material 120 may be allowed to harden at ambient temperature. However, in other illustrative examples, structure 106 and material 120 within hollow portion 114 of structure 106 may be cooled such that material 120 hardens. Material 120 hardens to form mandrel 102 with number of members 110 positioned within mandrel 102.

Once material 120 has hardened, lid 112 may be removed to expose material 120 in the form of mandrel 102. Thereafter, support system 137 may be removed. Heating system 148 may be used to apply heat 150 within selected range 152 to mandrel 102 and number of members 110 positioned within mandrel 102. In these illustrative examples, heat 150 may be applied to mandrel 102 and number of members 110 while mandrel 102 is still located within hollow portion 114 of structure 106.

In these illustrative examples, heating system 148 may be considered part of tool forming system 104. Heating system 148 may take the form of a heat lamp, an oven, or some other type of heating system. Selected range 152 for heat 150 may be selected such that heat 150 does not cause material 120 forming mandrel 102 to return to a semi-solid liquid state or a liquid state. In other words, selected range 152 may be below a threshold at which material 120 changes from a solid state to a semi-solid state.

However, selected range 152 may be above a threshold at which thermoplastic material 134 of number of members 110 becomes pliable. In response to heat 150, thermoplastic material 134 may become pliable. More specifically, thermoplastic material 134 in the form of heat-shrink material 136 may reduce in size such that each of number of members 110 reduces in size.

This reduction in size of each of number of members 110 may allow number of members 110 to be easily removed from structure 106, thereby leaving number of voids 154 within mandrel 102. In these illustrative examples, the reduction in size of each of number of members 110 in response to heat 150 allows number of members 110 to be removed without causing any undesired inconsistencies on and/or in mandrel 102. An undesired inconsistency may be any inconsistency outside of selected tolerances.

In this manner, mandrel 102 may be formed having number of voids 154. In one illustrative example, each void in number of voids 154 may be the open space that is left within mandrel 102 after a corresponding member in number of members 110 is removed from structure 106.

The size and shape of each tube in number of tubes 130 may be selected such that number of voids 154, formed when number of tubes 130 is removed from mandrel 102, has dimensions within selected tolerances. In particular, number of voids 154 may be formed such that the expansion of mandrel 102 in response to heat and/or pressure is substantially equal outwards and inwards. In other words, number of voids 154 may ensure that mandrel 102 does not expand outwards outside of selected tolerances.

Once mandrel 102 has been formed with number of voids 154, mandrel 102 may be used to form a composite structure. As one illustrative example, composite material 156 may be placed over mandrel 102. Composite material 156 may take the form of one or more composite laminates, each composite laminate comprised of any number of layers of material in this illustrative example. Composite material 156 may be placed over mandrel 102 such that composite material 156 conforms to the shape of mandrel 102. Depending on the implementation, composite material 156 may cover some or the entire outer surface of mandrel 102.

Curing system 158 may be used to cure composite material 156 over mandrel 102. In one illustrative example, curing system 158 takes the form of autoclave 160. Mandrel 102 with composite material 156 placed over mandrel 102 may be placed within autoclave 160 for curing.

During the curing process, number of voids 154 may provide expansion control for mandrel 102. In other words, number of voids 154 may be configured to control the expansion of material 120 forming mandrel 102 during the curing process such that substantially even pressure is applied to the entire portion of composite material 156 in contact with mandrel 102. In this manner, composite material 156 may be cured to form a composite structure having a desired shaped with a desired cross-sectional profile that has dimensions within selected tolerances.

The illustration of manufacturing environment 100 and tool forming system 104 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, lid 112 may be optional. For example, a smoothing tool may be used to smooth and flatten the surface of material 120 exposed within hollow portion 114 of structure 106 instead of lid 112. Material 120 may be left exposed to the environment around structure 106 and allowed to harden without the use of lid 112.

In other illustrative examples, number of members 110 may be implemented without needing to pass through both first number of openings 126 and second number of openings 128. For example, without limitation, a member in number of members 110 may be configured to be inserted through one opening in first number of openings 126 and then curved and passed back through another opening in first number of openings 126.

With reference now to FIGS. 2-10, illustrations of components and steps used in a process for forming a mandrel are depicted in accordance with an illustrative embodiment. The process described in FIGS. 2-10 may be an example of one manner in which a mandrel, such as mandrel 102 in FIG. 1, may be formed.

Figure 2:
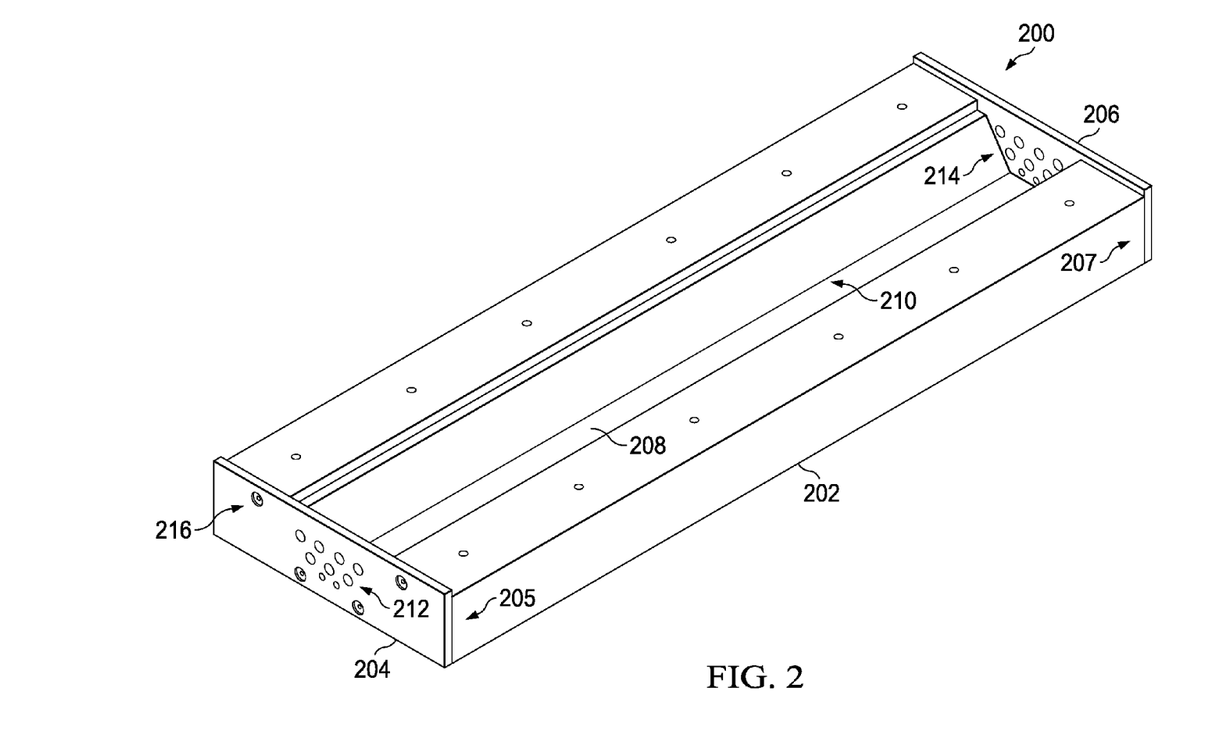
FIG. 2 is an illustration of a mandrel forming system in accordance with an illustrative embodiment.

Turning now to FIG. 2, an illustration of a mandrel forming system is depicted in accordance with an illustrative embodiment. Mandrel forming system 200 in FIG. 2 is an example of one implementation for tool forming system 104 in FIG. 1. In this illustrative example, mandrel forming system 200 includes structure 202, first plate 204, and second plate 206. Structure 202 is an example of one implementation for structure 106 in FIG. 1. Further, first plate 204 and second plate 206 are examples of implementations for first plate 122 and second plate 124, respectively, in FIG. 1.

As depicted, a portion of structure 202 forms cavity 208. Cavity 208 is an example of one implementation for hollow portion 114 of structure 106 and, in particular, cavity 118, in FIG. 1. Cavity 208 has shape 210.

In this illustrative example, first plate 204 has first number of openings 212, and second plate 206 has second number of openings 214. Each opening in first number of openings 212 corresponds to an opening in second number of openings 214.

First plate 204 is associated with first end 205 of structure 202, while second plate 206 is associated with second end 207 of structure 202. In particular, first plate 204 is fastened to first end 205 of structure 202 by plurality of fasteners 216. Second plate 206 is fastened to second end 207 of structure 202 by a plurality of fasteners (not shown in this view).

Figure 3:
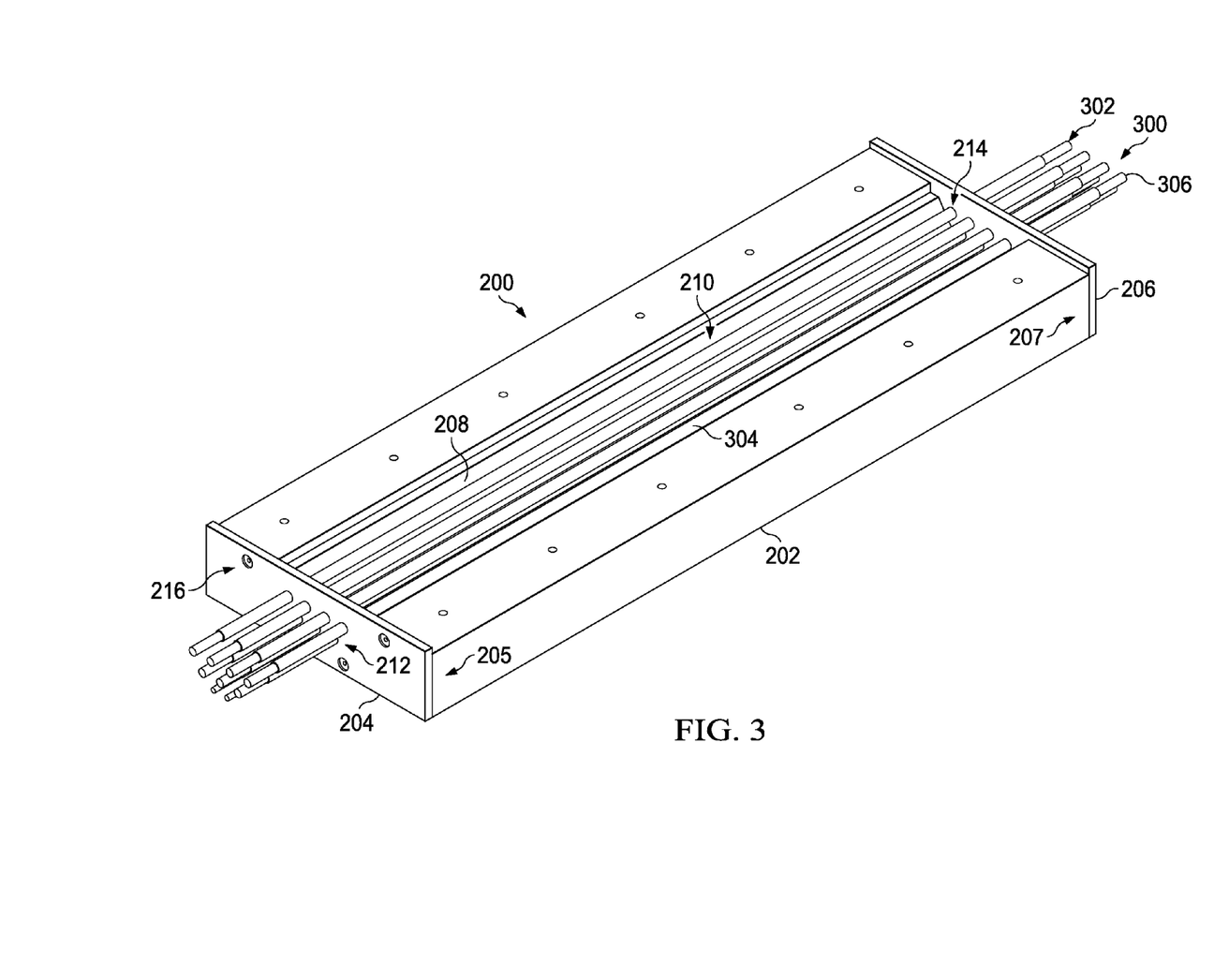
FIG. 3 is an illustration of a number of heat-shrink tubes of a structure within the mandrel forming system in accordance with an illustrative embodiment.

With reference now to FIG. 3, an illustration of a number of heat-shrink tubes suspended within cavity 208 of structure 202 in mandrel forming system 200 from FIG. 2 is depicted in accordance with an illustrative embodiment. In this illustrative example, number of heat-shrink tubes 300 may be an example of one implementation for number of members 110 and, in particular, number of heat-shrink tubes 135, in FIG. 1.

As depicted, number of rods 302 has been inserted into number of heat-shrink tubes 135. Number of rods 302 may be an example of one implementation for number of rigid members 138 and, in particular, number of rods 140, in FIG. 1. Heat-shrink tube 304 is an example of one of number of heat-shrink tubes 300. Rod 306 is an example of one of number of rods 302. Rod 306 has been inserted into a channel within heat-shrink tube 304. Similarly, each of number of rods 302 may be inserted into a channel within a corresponding heat-shrink tube in number of heat-shrink tubes 300.

In this illustrative example, number of heat-shrink tubes 300 with number of rods 302 inserted into number of heat-shrink tubes 300 has been passed through first number of openings 212 in first plate 204 and second number of openings 214 in second plate 206. Consequently, number of heat-shrink tubes 300 may be suspended within cavity 208 of structure 202.

The diameter for each heat-shrink tube in number of heat-shrink tubes 300 may be selected such that a number of voids in a mandrel formed using number of heat-shrink tubes 300 have dimensions that meet selected specifications. In some cases, each heat-shrink tube in number of heat-shrink tubes 300 may have the same diameter. In other examples, one or more of the heat-shrink tubes in number of heat-shrink tubes 300 may have a diameter that is different from other heat-shrink tubes in number of heat-shrink tubes 300.

In particular, the size of the diameters for the heat-shrink tubes in number of heat-shrink tubes 300 may be selected such that the mandrel formed using number of heat-shrink tubes 300 is configured to expand substantially equally outwards and inwards within the voids formed using number of heat-shrink tubes 300.

Figure 4:
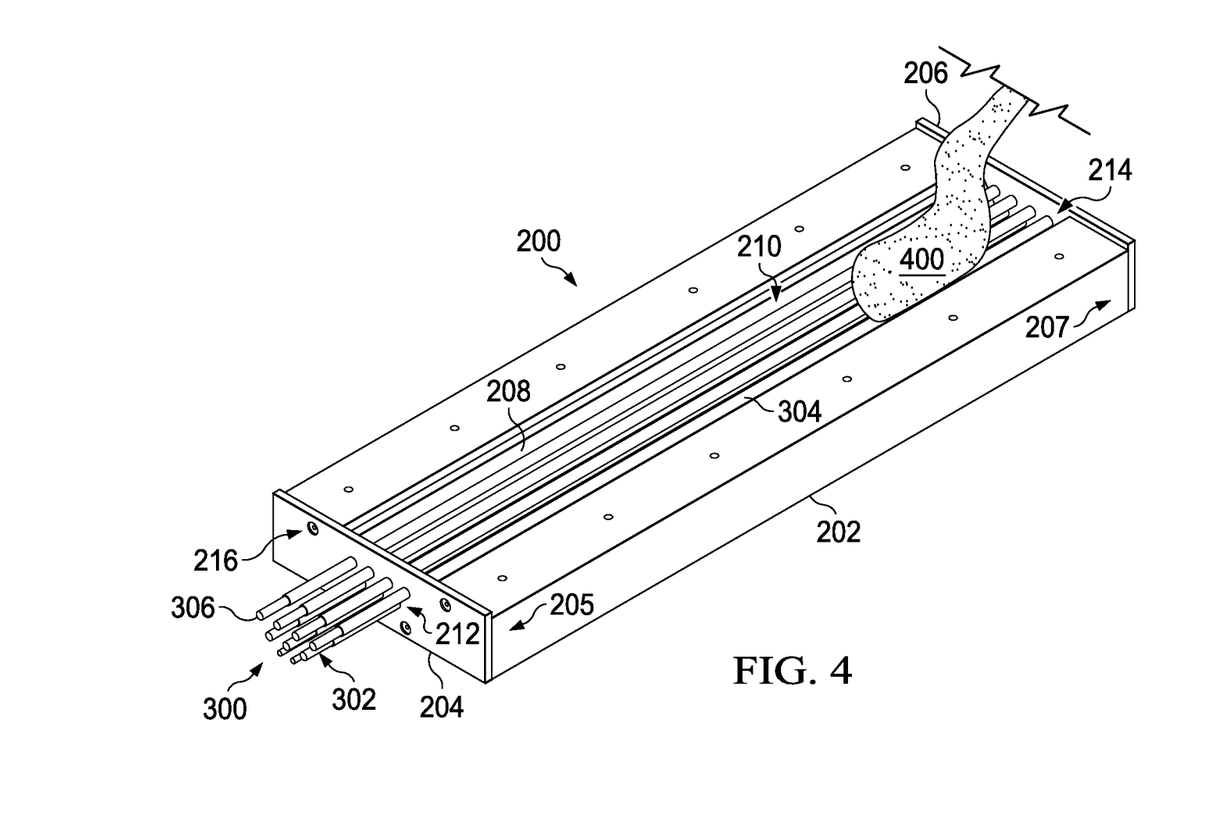
FIG. 4 is an illustration of material being poured into a cavity of a structure within the mandrel forming system in accordance with an illustrative embodiment.

With reference now to FIG. 4, an illustration of material being poured into cavity 208 of structure 202 in mandrel forming system 200 from FIG. 3 is depicted in accordance with an illustrative embodiment. As depicted in this example, material 400 may be poured into cavity 208 of structure 202 over number of heat-shrink tubes 300. Material 400 may be in a liquid or semi-solid state when poured into cavity 208. In this illustrative example, material 400 is an elastomeric material in a liquid state.

Figure 5:
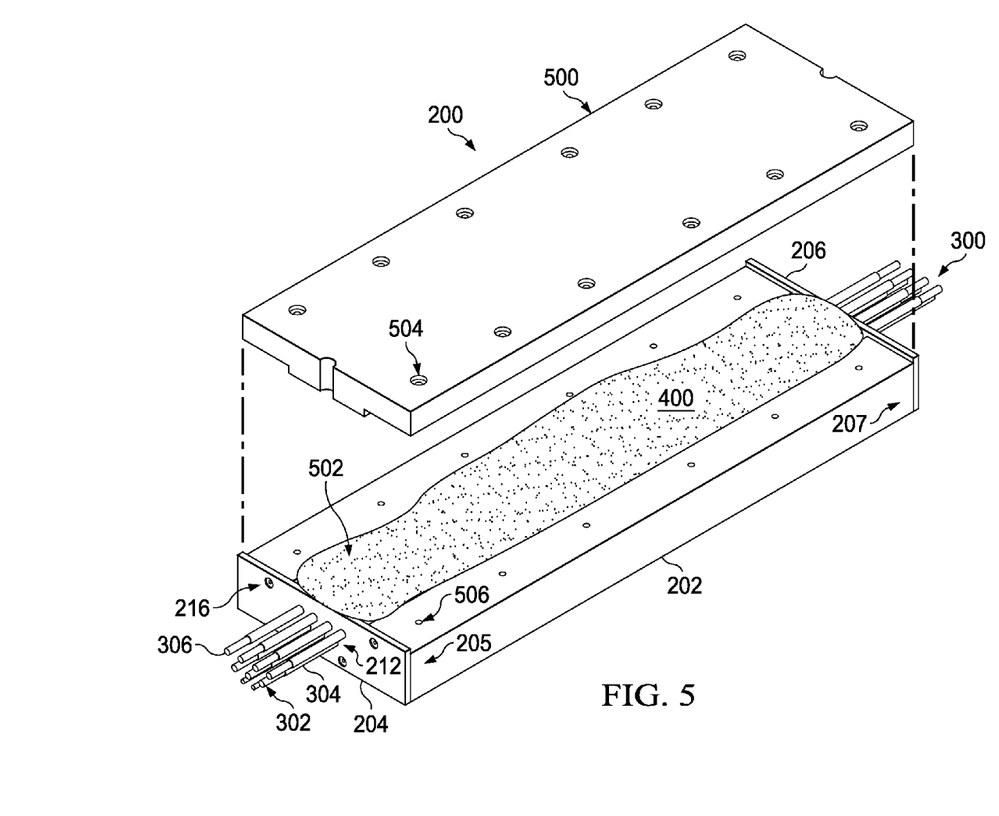
FIG. 5 is an illustration of the cavity of a structure within the mandrel forming system filled with material in accordance with an illustrative embodiment.

Turning now to FIG. 5, an illustration of cavity 208 filled with material 400 from FIG. 4 is depicted in accordance with an illustrative embodiment. In this illustrative example, cavity 208 of structure 202 has been substantially filled with material 400. Lid 500 may be part of mandrel forming system 200. Lid 500 may be configured for placement over structure 202 to cover exposed surface 502 of material 400.

As depicted, lid 500 has plurality of openings 504 and structure 202 has plurality of openings 506. Plurality of openings 504 may be configured to align with plurality of openings 506. In this manner, plurality of openings 504 and plurality of openings 506 may be configured to receive a plurality of fasteners that fasten lid 500 to structure 202.

Figure 6:
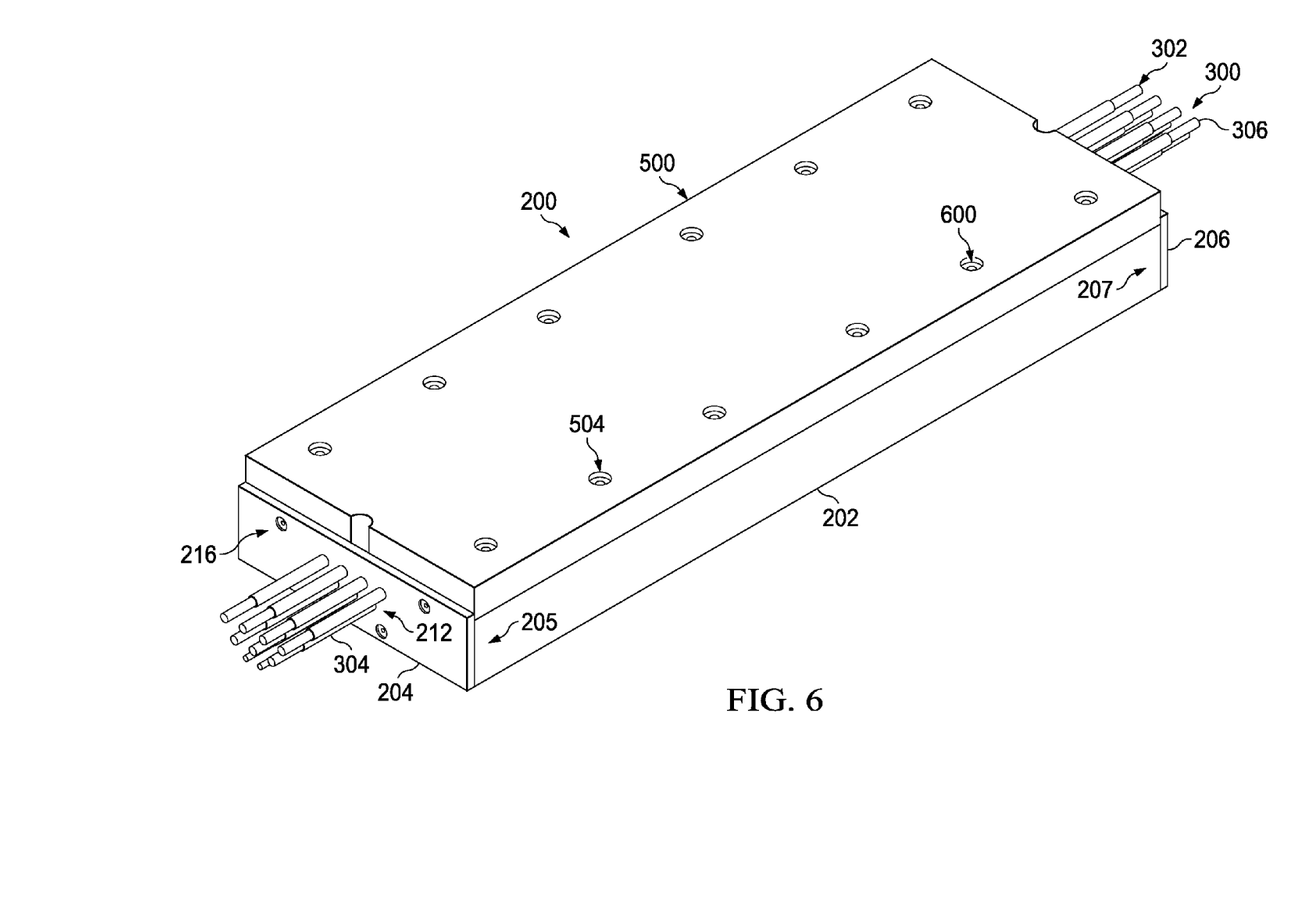
FIG. 6 is an illustration of a lid fastened to the structure within the mandrel forming system in accordance with an illustrative embodiment.

With reference now to FIG. 6, an illustration of lid 500 fastened to structure 202 is depicted in accordance with an illustrative embodiment. As depicted, lid 500 has been placed over structure 202 and fastened to structure 202. In particular, plurality of fasteners 600 may be used to fasten lid 500 to structure 202. Lid 500 may allow exposed surface 502 of material 400 in FIG. 5 to be smoothed and flattened out before material 400 hardens. Material 400 may be left within cavity 208 to harden at ambient temperature while covered by lid 500.

Figure 7:
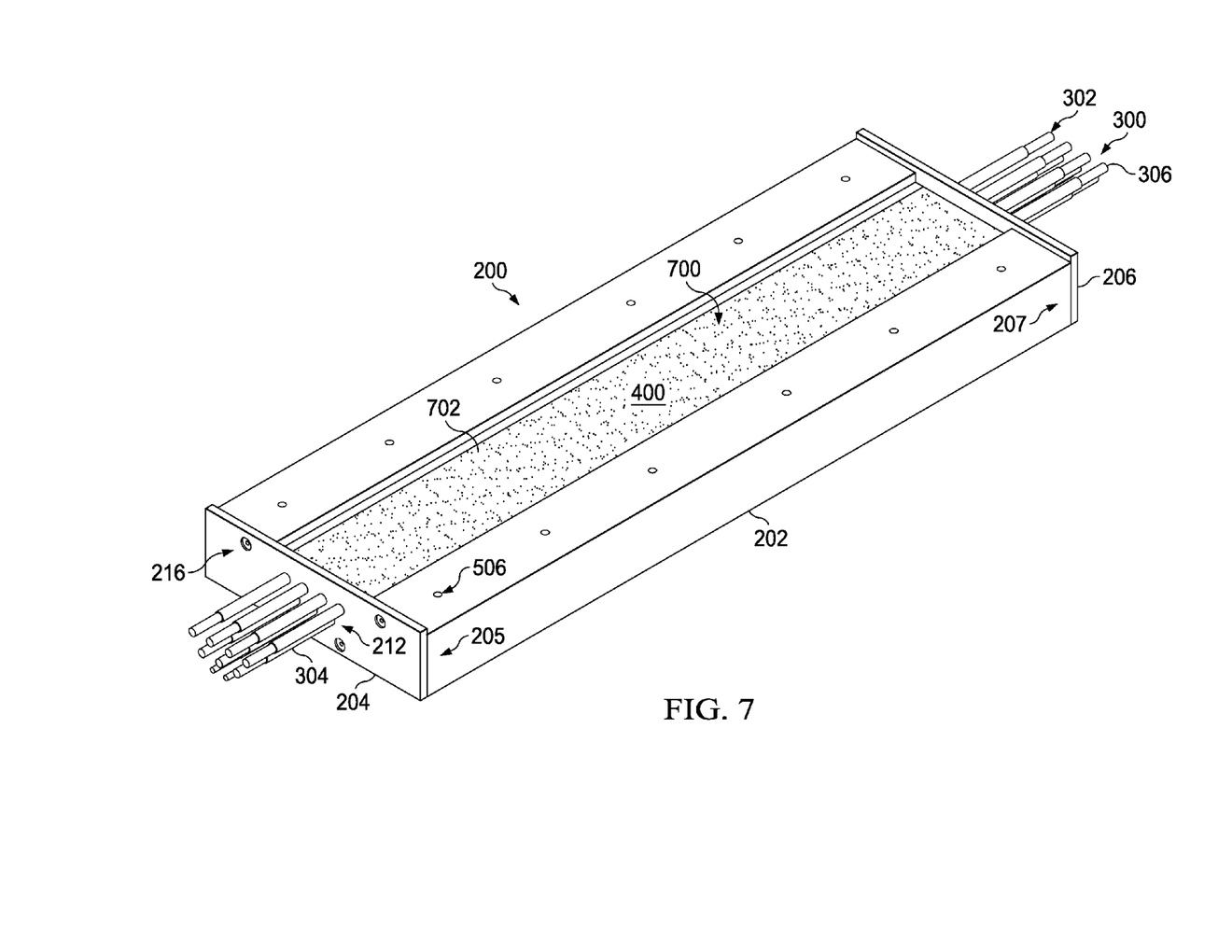
FIG. 7 is an illustration of a formed mandrel depicted in accordance with an illustrative embodiment.

Turning now to FIG. 7, an illustration of a formed mandrel is depicted in accordance with an illustrative embodiment. As depicted, lid 500 from FIG. 6 has been removed from structure 202. Material 400 has hardened to form mandrel 700. Mandrel 700 may be an example of one implementation for mandrel 102 in FIG. 1.

In this illustrative example, mandrel 700 has surface 702. Surface 702 of mandrel 700 may be substantially smooth and substantially flat in this illustrative example.

Figure 8:
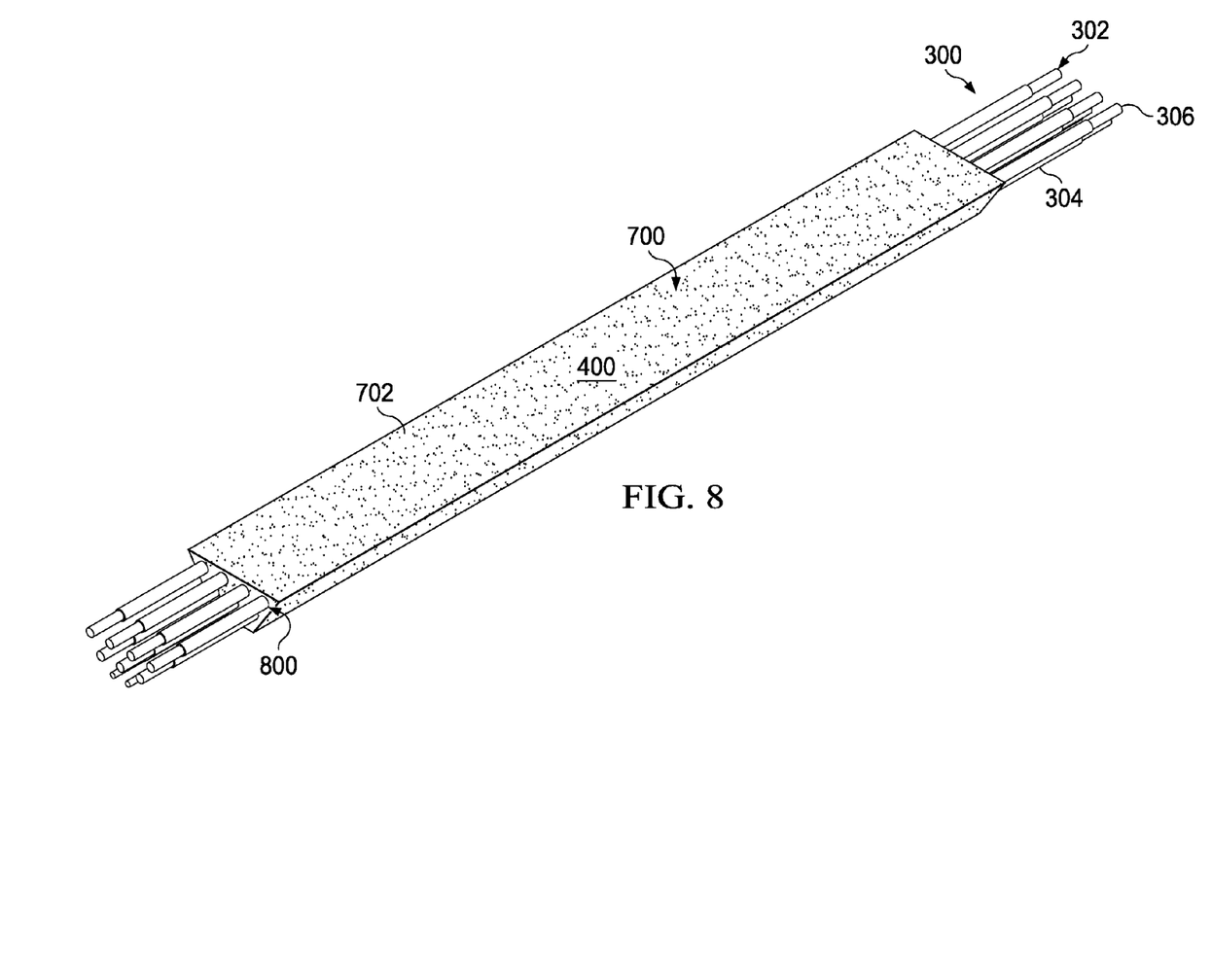
FIG. 8 is an illustration of a mandrel with the number of heat-shrink tubes and a number of rods in accordance with an illustrative embodiment.

With reference now to FIG. 8, an illustration of mandrel 700 with number of heat-shrink tubes 300 and number of rods 302 in number of heat-shrink tubes 300 positioned within mandrel 700 is depicted in accordance with an illustrative embodiment. In FIG. 8, first plate 204 and second plate 206 from FIG. 7 have been unfastened from structure 202 and slid away from structure 202, leaving number of heat-shrink tubes 300 and number of rods 302 in number of heat-shrink tubes 300 within mandrel 700.

Further, mandrel 700 has been removed from cavity 208 of structure 202. As depicted, number of heat-shrink tubes 300 may be filling number of voids 800 within mandrel 700. Number of heat-shrink tubes 300 may be removed to leave number of voids 800 in mandrel 700.

Figure 9:
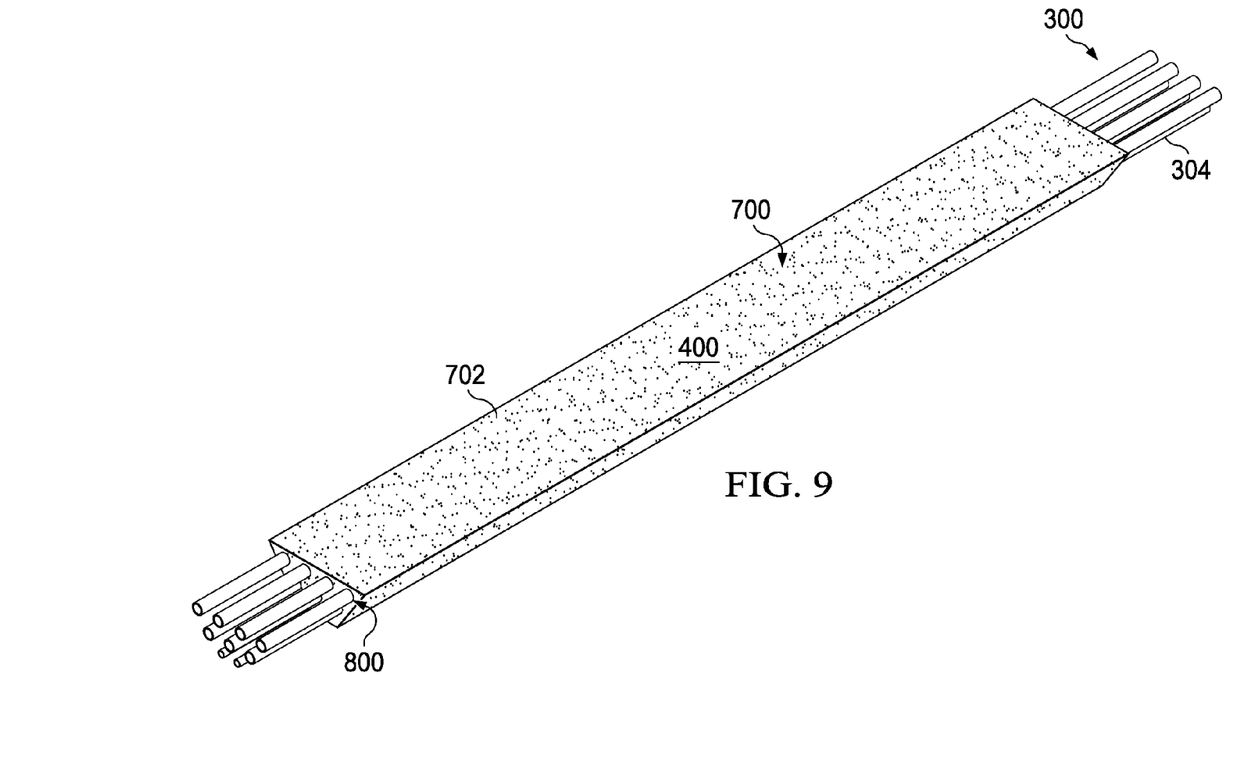
FIG. 9 is an illustration of the mandrel with the number of heat-shrink tubes positioned within the mandrel in accordance with an illustrative embodiment.

With reference now to FIG. 9, an illustration of mandrel 700 with number of heat-shrink tubes 300 positioned within mandrel 700 is depicted in accordance with an illustrative embodiment. In this illustrative example, number of rods 302 from FIG. 8 has been removed. Number of heat-shrink tubes 300 is left within number of voids 800 in mandrel 700.

Heat may be applied to number of heat-shrink tubes 300 to cause each of number of heat-shrink tubes 300 to reduce in size. In other words, each of number of heat-shrink tubes 300 may shrink, thereby reducing the amount of contact between each heat-shrink tube with mandrel 700 within the corresponding void in number of voids 800. This reduction in size may be performed without causing any undesired inconsistencies on and/or in mandrel 700. In this manner, number of heat-shrink tubes 300 may be easily removed from mandrel 700.

Figure 10:
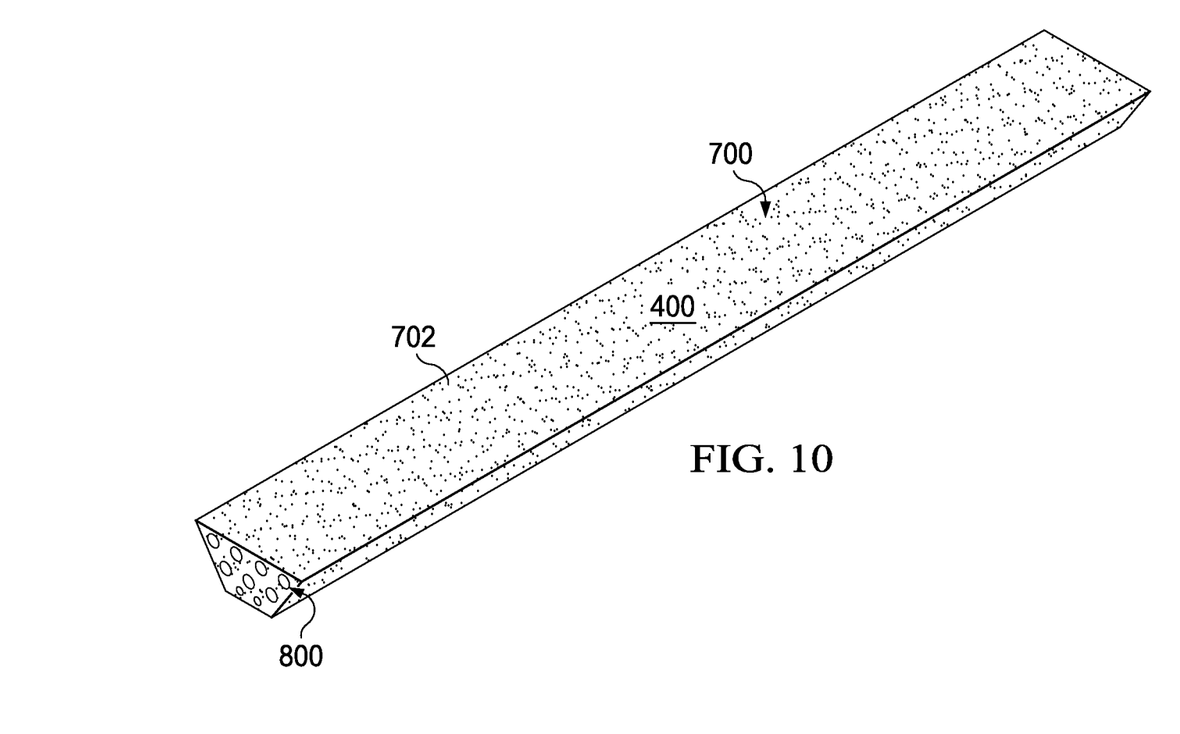
FIG. 10 is an illustration of the mandrel in accordance with an illustrative embodiment.

With reference now to FIG. 10, an illustration of mandrel 700 is depicted in accordance with an illustrative embodiment. In FIG. 10, number of heat-shrink tubes 300 from FIG. 9 has been removed from mandrel 700. In particular, number of heat-shrink tubes 300 from FIG. 9 has been removed from mandrel 700 without causing any undesired inconsistencies on and/or in mandrel 700. Number of voids 800 left within mandrel 700 may be used for expansion control when mandrel 700 is used for curing a composite material.

Figure 11:
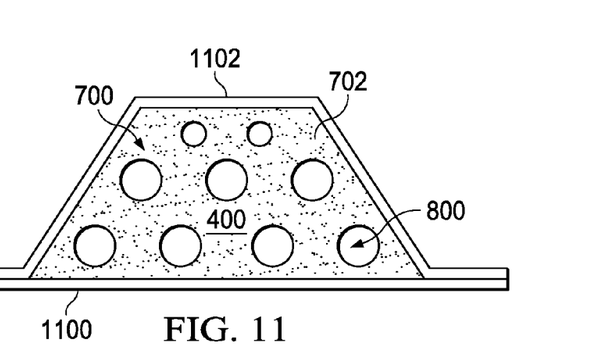
FIG. 11 is an illustration of the mandrel being used to form a composite structure in accordance with an illustrative embodiment.

With reference now to FIG. 11, an illustration of mandrel 700 from FIG. 10 being used to form a composite structure is depicted in accordance with an illustrative embodiment. In FIG. 11, mandrel 700 has been placed on composite laminate 1100. Further, composite laminate 1102 has been placed over mandrel 700.

Composite laminate 1100 and composite laminate 1102 may be cured with mandrel 700 positioned between these two composite laminates. During the curing process, number of voids 800 may be used to control expansion of mandrel 700. For example, because material 400 used to form mandrel 700 is comprised of an elastomeric material, mandrel 700 may be sensitive to heat and/or pressure and may expand during curing.

Number of voids 800 may provide open space into which mandrel 700 may expand inwards. In particular, number of voids 800 may be formed such that the expansion of mandrel 700 outwards is substantially equal to the expansion of mandrel 700 inwards into number of voids 800. In this manner, substantially even pressure may be applied to the portions of composite laminate 1100 and composite laminate 1102 that are in contact with mandrel 700 during the curing process.

Without number of voids 800, the pressure applied to the portions of composite laminate 1100 and/or composite laminate 1102 in contact with mandrel 700 may become uneven during curing as mandrel 700 expands. Consequently, without number of voids 800 in mandrel 700, the shape of the composite structure formed by composite laminate 1100 and composite laminate 1102 may not match a desired shape. Further, without number of voids 800, one or more cross-sections through the composite structure may not match a desired cross-sectional profile for the composite structure.

The illustrations of mandrel forming system 200 in FIGS. 2-7, number of heat-shrink tubes 300 in FIGS. 3-9, and mandrel 700 in FIGS. 7-11 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Additionally, some of the components in FIGS. 2-11 may be illustrative examples of how components shown in block form in FIG. 1 can be implemented as physical structures. The different components shown in FIGS. 2-11 may be combined with components in FIG. 1, used with components in FIG. 1, or a combination of the two.

Figure 12:
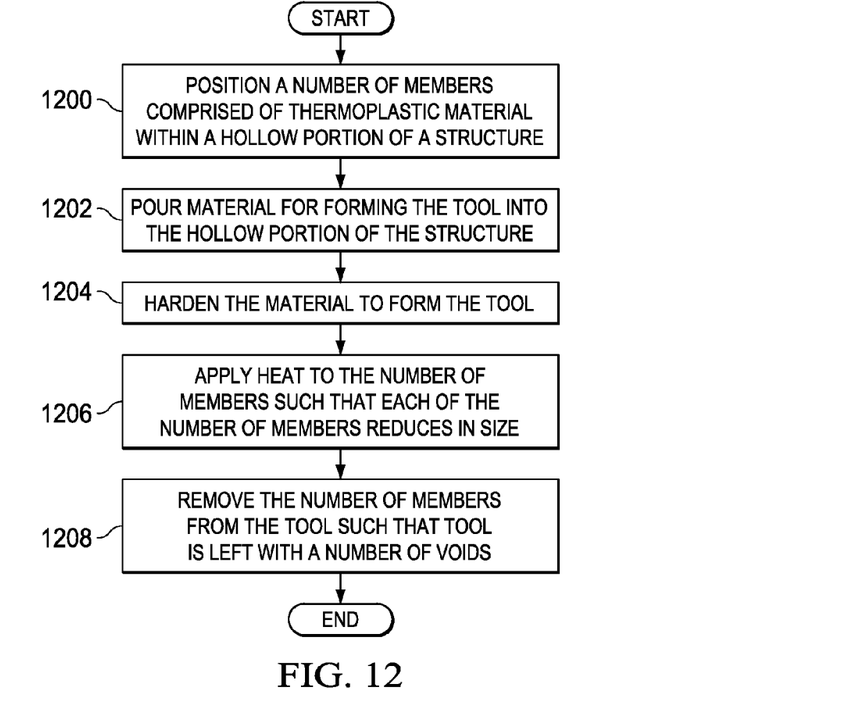
FIG. 12 is an illustration of a process for forming the mandrel in the form of a flowchart in accordance with an illustrative embodiment.

With reference now to FIG. 12, an illustration of a process for forming a tool in the form of a flowchart is depicted in accordance with an illustrative embodiment. The process illustrated in FIG. 12 may be implemented using a tool forming system such as, for example, tool forming system 104 in FIG. 1, to form a tool, such as, for example, tool 101 in FIG. 1.

The process begins by positioning a number of members comprised of thermoplastic material within a hollow portion of a structure (operation 1200). The thermoplastic material may be, for example, a heat-shrink material. The structure may be used for holding the material that will be used to form the tool. The tool to that is to be formed may be a mandrel. The hollow portion of the structure may be referred to as a cavity.

Next, material for forming the tool is poured into the hollow portion of the structure (operation 1202). In operation 1202, the material may be an elastomeric material, such as rubber, in a liquid state. The material may surround the number of members when poured into the hollow portion of the structure in operation 1202.

Thereafter, the material is hardened to form the tool (operation 1204). In operation 1204, the material may be hardened at ambient temperature. Then, heat may be applied to the number of members such that each of the number of members reduces in size (operation 1206). The number of members may then be removed from the tool such that tool is left with a number of voids (operation 1208), with the process terminating thereafter.

The flowchart and block diagram in the different depicted embodiments illustrate the architecture, functionality, and operation of some possible implementations of apparatus and methods in an illustrative embodiment. In this regard, each block in the flowchart and block diagram may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 13:
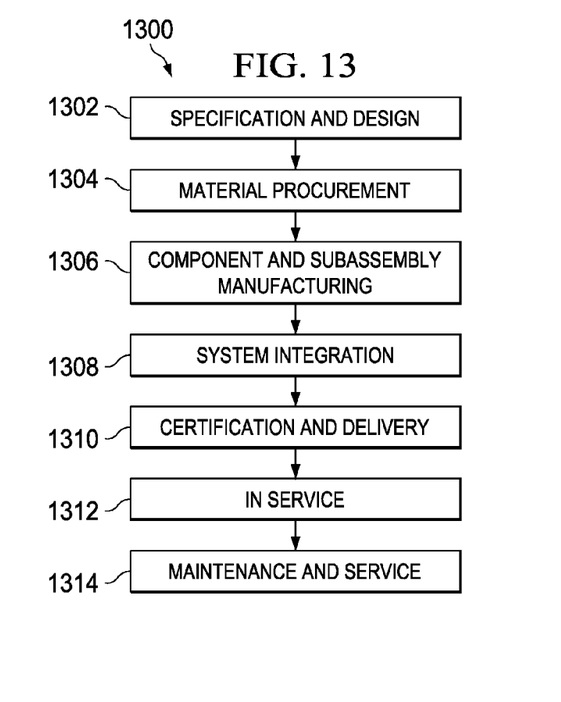
FIG. 13 is an illustration of an aircraft manufacturing and service method in accordance with an illustrative embodiment.
Figure 14:
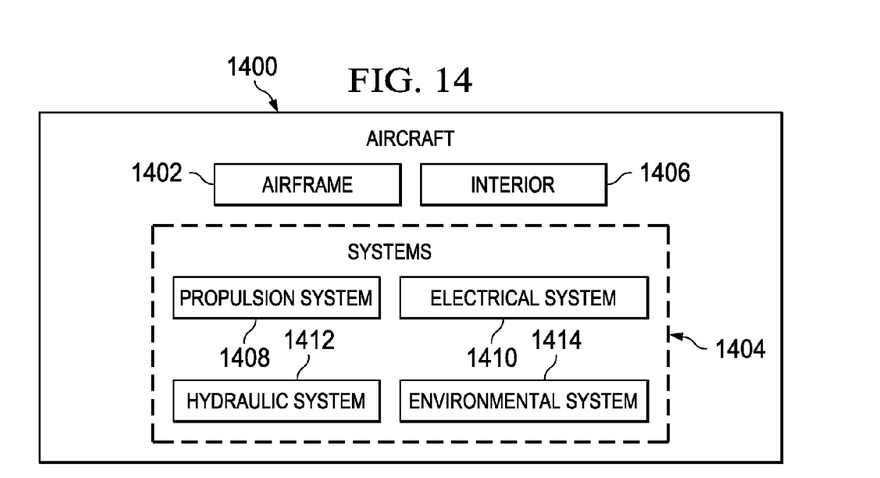
FIG. 14 is an illustration of an aircraft in accordance with an illustrative embodiment.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. For example, a mandrel, such as mandrel 102 in FIG. 1 and/or mandrel 700 in FIGS. 7-11 may be formed during one of component and subassembly manufacturing 1306 and/or routine maintenance and service 1314 in FIG. 13. In one illustrative example, the mandrel may be formed for use in manufacturing a component for aircraft 1400 during component and subassembly manufacturing 1306.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312 and/or during maintenance and service 1314 in FIG. 13. The use of a number of the different illustrative embodiments may substantially expedite the assembly of and/or reduce the cost of aircraft 1400.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming a tool, the method comprising:
   inserting a support system within a number of members comprised of a thermoplastic material;
   positioning the number of members within a hollow portion of a structure;
   forming the tool within the hollow portion of the structure with the number of members positioned within the hollow portion of the structure, wherein the tool is a silicone material;
   applying heat within a selected range to the number of members to reduce a size of each of the number of members; and
   removing the number of members from the tool such that the tool is left with a number of voids.

2. The method of claim 1, wherein the step of forming the tool within the hollow portion of the structure with the number of members positioned within the hollow portion of the structure comprises:
   pouring the silicone material for forming the tool into the hollow portion of the structure with the number of members positioned within the hollow portion of the structure; and
   hardening the silicone material to form the tool, wherein the tool is a mandrel configured for use in curing a composite material to form a composite structure.

3. The method of claim 1, wherein the step of positioning the number of members comprised of the thermoplastic material within the hollow portion of the structure comprises:
   inserting the number of members through a first number of openings in a first plate associated with a first end of the structure and through a second number of openings in a second plate associated with a second end of the structure such that the number of members is suspended within the hollow portion of the structure.

4. The method of claim 3 wherein the support system comprises a number of rigid members, the method further comprising:
   inserting the number of rigid members into the number of members prior to the positioning step;
   removing the number of rigid members from the number of members after the forming step and prior to the applying step; and
   wherein the number of rigid members are configured to allow the number of members to have a stiffness within a selected range while the number of members are suspended within the hollow portion of the structure by the first number of openings in the first plate at a first end of the structure and the second number of openings in the second plate at the second end of the structure.

5. The method of claim 4,
   wherein the tool is a mandrel configured for use in curing a composite material to form a composite structure of an aircraft;
   wherein during a curing process, the number of voids within the mandrel control expansion of the mandrel;
   wherein the mandrel is sensitive to heat and pressure and expands during the curing process of the composite structure; and
   wherein the number of voids provide open space into which the mandrel expands inwards.

6. The method of claim 1 further comprising:
   supporting the number of members within the hollow portion of the structure using the support system.

7. The method of claim 6, wherein the step of supporting the number of members within the hollow portion of the structure using the support system comprises:
   supporting the number of members within the hollow portion of the structure using the support system selected from one of a number of rigid members, a number of spacers, and a tension system.

* * * * *